(12) United States Patent
Brkovic

(10) Patent No.: US 6,567,279 B2
(45) Date of Patent: May 20, 2003

(54) SIMPLE AND EFFICIENT ISOLATED SWITCHING REGULATOR FOR FAST TRANSIENT LOADS

(75) Inventor: Milivoje Slobodan Brkovic, Carlsbad, CA (US)

(73) Assignee: di/dt, Inc., Carlsbad, CA (US)

( * ) Notice: Subject to any disclaimer, the term of this patent is extended or adjusted under 35 U.S.C. 154(b) by 0 days.

(21) Appl. No.: 10/187,645

(22) Filed: Jul. 2, 2002

(65) Prior Publication Data

US 2003/0007376 A1 Jan. 9, 2003

Related U.S. Application Data

(60) Provisional application No. 60/303,125, filed on Jul. 5, 2001.

(51) Int. Cl.[7] .................. H02M 3/335; H02M 3/24; G05F 1/40
(52) U.S. Cl. ............... 363/17; 363/98; 363/132; 323/282
(58) Field of Search .................. 363/16, 17, 56.01, 363/56.02, 56.05, 56.12, 97, 98, 131, 132; 323/282, 285, 290

(56) References Cited

U.S. PATENT DOCUMENTS

| | | | | | |
|---|---|---|---|---|---|
| 5,465,201 A | * | 11/1995 | Cohen | .................. | 363/21 |
| 5,877,611 A | * | 3/1999 | Brkovic | .................. | 323/222 |
| 5,982,160 A | * | 11/1999 | Walters et al. | .................. | 323/282 |
| 5,999,433 A | * | 12/1999 | Hua et al. | .................. | 363/132 |
| 6,127,814 A | * | 10/2000 | Goder | .................. | 323/282 |
| 6,396,716 B1 | * | 5/2002 | Liu et al. | .................. | 363/17 |

* cited by examiner

Primary Examiner—Matthew Nguyen
(74) Attorney, Agent, or Firm—Lowenstein Sandler PC

(57) ABSTRACT

A switching regulator provides load dependent output voltage regulation by sensing voltage drop across inherent DC resistance of the output inductor and secondary windings of power transformer with a first and second resistor and a capacitor and feeding back sensed voltage into an error amplifier for controlling the switching regulator. The regulator may be paralleled for more output current by connecting the outputs together and providing a common reference voltage to all the regulators.

24 Claims, 3 Drawing Sheets

US 6,567,279 B2

SIMPLE AND EFFICIENT ISOLATED SWITCHING REGULATOR FOR FAST TRANSIENT LOADS

This application claims the priority benefit of U.S. Provisional Application No. 60/303,125, filed Jul. 5, 2001, which is hereby incorporated herein by reference. This application is related to U.S. patent application Ser. No. 10/187,782, filed Jul. 3, 2002, to Miki Brkovic, entitled: *Inductor Current Sensing In Isolated Switching Regulators And Related Methods,* hereby incorporated herein by reference.

FIELD OF THE INVENTION

This invention relates generally to switch-mode regulators in general and, more particularly, to low output voltage switching regulators with isolation.

BACKGROUND DISCUSSION

Switch-mode regulators are widely used to supply power to electronic devices, such as in computers, printers, telecommunication equipment, and other devices. Such switch-mode regulators are available in variety of configurations for producing the desired output voltage or current from a source voltage with or without galvanic isolation. The former are also known as an isolated power converters and the later are called a non-isolated power converters.

One of the more challenging loads for power supplies are microprocessors. Because most of the microprocessors are implemented in complementary metal-oxide-semiconductor (CMOS) technology, the power dissipation of the microprocessor generally increases linearly with the clock frequency and to the square of the power supply voltage. There are three common techniques used to reduce power dissipation: power supply voltage reduction, selective clock speed reduction and reducing capacitive loading of internal nodes within the microprocessor. The first two techniques may be used in combination and could be controlled by circuit designer. Even a small reduction in power supply voltage makes a significant reduction in power dissipation. Also, if the clock is removed or significantly slowed in portions of the microprocessor not being used at any given time, very little power is dissipated in those portions and the overall power dissipated is significantly reduced.

However, these power savings techniques come at a cost. Power supply current can swing widely—from hundreds of milli-amperes to over few tens amperes with the microprocessor unable to tolerate more than a few percent change in voltage. Further, the change in current can occur in tens of nanoseconds and may change in an order of magnitude. The power supply designed to supply the microprocessor must have a sufficient low impedance and tight regulation to supply such dynamic power consumption. With output voltages approaching 1V or even sub-volt levels and load currents approaching hundred amperes, the power supplies are very difficult to make and control and still operate efficiently.

In addition, a dedicated power supply for the microprocessor has to be placed in close proximity to the microprocessor. Thus, the power supply must be small and efficient. To meet these requirements, a small DC-to-DC switching power regulator is usually used. The widely used switching regulator to convert a higher input voltage (usually 5V or 12V) to a lower output voltage level is "buck" regulator. In applications where input voltage, often referred as bus voltage, is greater than 12V (e.g. 24V or 48V) single non-isolated switching regulator, such as "buck" regulator, becomes very difficult to make small and efficient. In addition, in these applications a galvanic isolation is very often required thus switching regulator needs to have isolation. One of the most common approaches is to use two stage conversion. First stage conversion is provided using an isolated switching regulator in order to provide galvanic isolation and to step-down high voltage input bus (typically 48V) to lower voltage bus (5V or 3.3V). The second stage is then realized using "buck" switching regulator. Obvious disadvantages of this approach are need for two switching regulators which increases overall cost and reduces overall efficiency.

Three kinds of feedback are generally used to control the operation of the regulator: voltage alone (with current limiting), voltage with peak current control, and voltage with the average current control. For reference see "Fueling the Megaprocessors—Empowering Dynamic Energy Management" by Bob Mammano, published by the Unitrode Corporation, 1996. The voltage with the average current control type of regulation is generally preferred over the other types for the described reasons. Regardless of which type of the feedback control is used, there is need for output current sensing either directly on indirectly. The most common approach is to the sensing resistor in series with the output inductor.

The circuit reconstructs the output inductor current as a differential voltage across the sensing resistor. Most integrated circuits using this approach regulates output voltage with current mode control and use the signal for output voltage feedback. The sensing resistor value must be on one side large enough to provide a sufficiently high voltage, usually tens of millivolts, to overcome input offset errors of the sense amplifier coupled to the sensing resistor and yet small enough to avoid excessive power dissipation. Since the power dissipated in the sensing resistor increases with the square of current, this approach has the obvious efficiency drawback with high output current and low output voltage. For low voltage, high current applications, the value of the sensing resistor may be close or even higher than the on resistance of the power switch and inductor which are minimized for maximum efficiency. Thus, sensed signal is relatively small and requires use of more expensive either comparators or amplifiers. Further, the circuitry implementing the average current control technique is significantly more complicated than the circuitry of the other two techniques.

Power inductors are known to have parasitic (or inherent) winding resistance, and therefore can be represented by an equivalent circuit of a series combination of an ideal inductor and a resistor. When direct (DC) current flows through the inductor (or a current having a DC component), a DC voltage drop is imposed across the inductor, which voltage is a product of the magnitude of the DC (component of the) current and the parasitic resistance of the inductor. Since such an inductor may already be present in the circuit, there is no an additional loss of efficiency in using the inductor for this purpose.

Parasitic resistance of the output inductor is used for current sensing as described in U.S. Pat. No. 5,465,201, issued to Cohen, U.S. Pat. No. 5,877,611, issued to Brkovic, U.S. Pat. No. 5,982,160, issued to Walters et al. and U.S. Pat. No. 6,127,814, issued to Goder, all of which patents are hereby incorporated herein by reference. In U.S. Pat. No. 5,877,611 and U.S. Pat. No. 5,982,160 load current dependant output voltage regulation employing inductor current sensing is proposed. Again, sensed signal is limited to product of inductor's winding resistance and inductor current and can be increased only by means of active amplification, which adds complexity, inaccuracy and mostly additional cost. In order to maximize efficiency of the converter, inductor's parasitic resistance (particular at high current applications) has to be minimized thus, the sensed signal is relatively small and requires use of more expensive either comparators or amplifiers. Very often error due to offset in comparator and/or amplifier is larger than variation in the winding resistance of the inductor (windings printed on the PCB).

Perhaps the most common approach to sensing the output inductor current indirectly in isolated topologies is to use sense resistor in series with power switches or current sense transformer. Use of sense resistor in single ended topologies, such as for example forward, flyback and others, as well as in full-bridge and push-pull topologies, allows that one end of sense resistor is coupled to GND pin of control chip, usually coupled to input return, which simplifies current sensing. On other hand, the sensing resistor value must be large enough to keep the sensed signal above the noise floor and yet small enough to avoid excessive power dissipation. In case of half-bridge converter, for example, this approach is not good since only one power switch is coupled to input return and sensed signal does not reflect current through second, floating power switch. Using sense resistor in return input path is also not good solution since sensed current is not exactly current through primary side switches but rather an input current of the converter smoothed by input capacitors. Also, sensed switch current differs from the output inductor current due to magnetizing current of isolation transformer which also varies with the input voltage. Using current sense transformer is not practical solution for two main reasons: it still measures the sum of the magnetizing and reflected output inductor current and it becomes difficult to implement in low profile high power density switching regulators.

SUMMARY OF THE INVENTION

Therefore, it is an object of the present invention to provide an efficient isolated switching regulator having a voltage and current control technique.

It is another aspect of the invention to provide a switching regulator having a fast transient response with relatively simple control circuitry.

It is a further aspect of the invention to provide a switching regulator design that allows for parallel operation.

This and other aspects of the invention may be obtained generally in a computing system, a switching regulator for powering a load including microprocessor, the switching regulator comprising an input voltage source, a switching circuit and an transformer for coupling the input voltage source and an output stage, the switching circuit comprising at least two controllable power switches and a first and a second rectifier switch, the transformer comprising at least one primary winding coupled to the input voltage source via at least two controllable power switches and a first and a second secondary windings, the first and the second secondary winding having inherent resistances, the first and the second secondary windings coupled together in series at a first node, the first and the second rectifier switches coupled in series at a second node, the first secondary windings coupled to the first rectifier switch at a third node, the second secondary winding coupled to the second rectifier switch at fourth node, the output stage having an output stage input and a output stage output, the output stage input coupled to the first node and the second node, the output stage output coupled to a load circuit, the output stage input and the output stage output having a common node, the output stage comprising an inductor for providing output current to the load circuit, the inductor having a first terminal for coupling to the output stage input and a second terminal for coupling to the output stage output, a first resistor having a first and a second terminal, a second resistor having a first and a second terminal, a capacitor having a first and a second terminal, the first terminal of the first resistor coupled to the node three and the first terminal of the second resistor coupled to the node four, the second terminal of the first resistor coupled to the second terminal of the second resistor and the first terminal of the capacitor at a node five, the second terminal of the capacitor coupled to the second terminal of the inductor and the node five is coupled to an input of an error amplifier for controlling the switching circuit.

In one embodiment of the present invention a third resistor is disposed in parallel with the capacitor for additional adjustment of the droop voltage.

In one embodiment of the present invention a first impedance is coupled between the fifth node and an inverting input of the error amplifier and a second impedance is disposed between the output and inverting input of the error amplifier.

In one embodiment of the present invention a fourth resistor is connected to the error amplifier inverting input for adjusting output voltage to a reference voltage.

In one embodiment of the present invention a third impedance is coupled between the output stage output and inverting input of said error amplifier. In one embodiment, the first impedance provides DC coupling so the output voltage is load dependant while, the third impedance provides only AC coupling from the output voltage of the switching regulator for improved transient response. In yet another embodiment, the first impedance provides only AC coupling while, the third impedance provides DC coupling from the output voltage of the switching regulator for load independent regulation. By selecting the first impedance to provide only AC coupling, current feedback is fed into the error amplifier only during the load current transients thus providing more stable transient response.

In one embodiment of the present invention a switching regulator with load dependent regulation is parallel-coupled to a plurality of switching regulators sharing a common reference voltage and common output coupled to the load.

BRIEF DESCRIPTION OF THE DRAWING

The objects, advantages and features of the invention will be more clearly perceived from the following detailed description, when read in conjunction with the accompanying drawing, in which.

DETAILED DESCRIPTION

Figure 1:
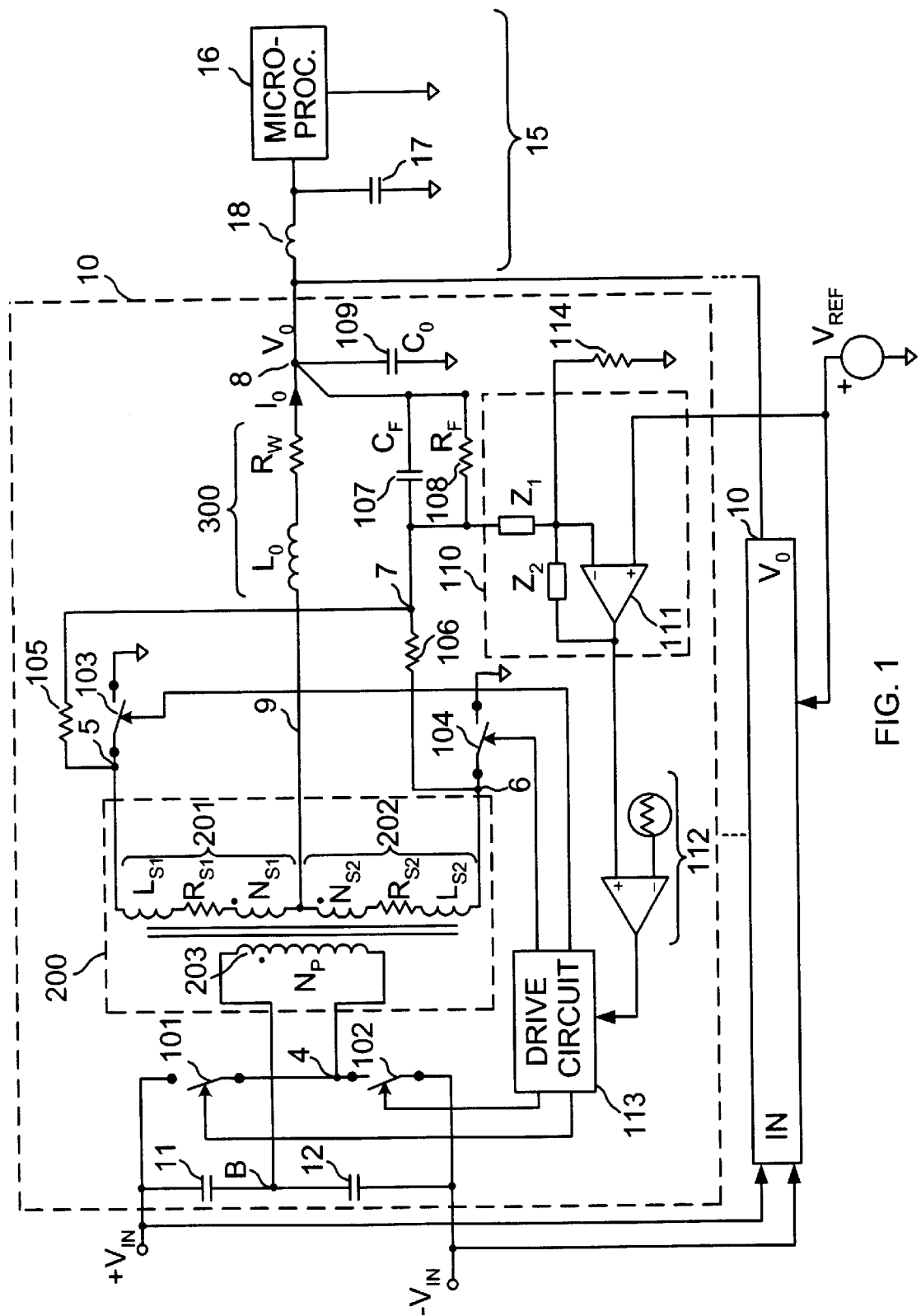
FIG. 1 is an exemplary schematic diagram of exemplary paralleled half-bridge switching regulators, each with voltage and current control.

With reference now to FIG. 1, there is shown an exemplary computing system 5, having a switching regulator 10 for powering a load 15 including a microprocessor 16. The switching regulator 10 is a half-bridge regulator, shown as an example, having power switches 101, 102, rectifier switches 103 and 104, an input capacitors 11 and 12, an output capacitor 109, a transformer 200, an inductor 300 and an error amplifier 110. The error amplifier 110 has an input for controlling the power switches, 101 and 102, and rectifier switches, 103 and 104. Transformer 200 has one primary winding 203 and two secondary windings 201 and 202 coupled in series at a node 9. Secondary winding 201 is coupled to the rectifier switch 103 at a node 5 and secondary winding 202 is coupled to the rectifier switch 104 at a node 6. The inductor 300 is coupled between node 9 and output capacitor 109 at a node 8. A first resistor 105 is coupled between node 5 and to node 7. A second resistor 106 is coupled between node 6 and node 7. A capacitor 107 is coupled between node 7 and node 8. Node 7 is in turn coupled to the input of the amplifier 110. Thus, first resistor 105, second resistor 106 and capacitor 107 combine to be the feedback path for controlling the switching regulator 10.

In more detail, the switching regulator 10, here a half-bridge regulator, takes an input voltage $V_{IN}$ and converts it to a lower voltage with galvanic isolation for use by load 15. The load 15 is illustrated here as a microprocessor 13 with an exemplary one of a plurality of bypass capacitors 17 and inductance 18 (shown as a lumped inductance) representing the distributed inductance of the power supply printed circuit board (PCB) traces.

The switching regulator 10 includes power switches 101, 102, rectifier switches 103 and 104, an input capacitors 11 and 12, an output capacitor 109, a transformer 200 and an inductor 300 (which includes an inherent DC resistance $R_w$, discussed below). Input voltage $V_{IN}$ is split with capacitors 11 and 12 coupled in series at a node B. Power switches are coupled in series at a node A and across the input voltage $V_{IN}$. Transformer 200 has one primary winding 203 (with number of turns $N_P$) coupled between node A and node B and two secondary windings 201 and 202 (which include an inherent DC resistance $R_{S1}$, and $R_{S2}$, and leakage inductance $L_{S1}$, and $L_{S2}$, respectively and discussed below) coupled in series and to the inductor 300 at a node 9. Secondary winding 201 is also coupled to the rectifier switch 103 at a node 5 and secondary winding 202 is also coupled to the rectifier switch 104 at a node 6. The inductor 300 is also coupled to the output capacitor 109 at a node 8. Drive waveforms for switches are such that when power switch 101 is on, power switch 102 and rectifier switch 104 are both off and switch 103 is on. During on time of power switch 101 the power is delivered from $V_{IN}$ to the load 15 and load current flows through power switch 101, primary winding 203, rectifier switch 103, secondary winding 201, and output inductor 300. In contrast, when power switch 102 is on, power switch 101 and rectifier switch 103 are off and rectifier switch 104 is on. During on time of power switch 102 the power is delivered from $V_{IN}$ to the load 15 and load current flows through power switch 102, primary winding 203, rectifier switch 104, secondary winding 202 and output inductor 300. When both power switches 101 and 102 are off, rectifier switches 103 and 104 are both on, load current is supplied from inductor 300 and splits in between rectifier switches 103 and 104, and secondary windings 201 and 202. As a consequence, during off time (non-conducting time) of power switches 101 and 102, windings of the transformer 200 are shorted. A first resistor 105 is coupled between node 5 and to node 7 and a second resistor 106 is coupled between node 6 and node 7. A capacitor 107 is coupled between node 7 and node 8 and node 7 is in turn coupled to an error amplifier 110, having in combination impedances $Z_1$, $Z_2$ and operational amplifier 111. Impedances $Z_1$, $Z_2$ may include reactive elements to achieve optimum compensation to the overall operation of the regulator 10.

The output of amplifier 110 drives a modulator 112. The modulator 112 (shown here as a conventional pulse-width modulator) generates signal for adjusting an operating parameter of the driver circuitry 113. The drive circuitry 113 than controls switches 101, 102, 201 and 202, as described above, and adjusts operating parameter of the regulator to regulate output voltage $V_O$. Those of skill in art will readily appreciate the various constructions and operations of the modulator 112 and drive circuitry 113. The modulator could be, for example, pulse width modulator (PWM) as well as any other type of modulator operating at constant or variable switching frequency.

The combination of resistors 105 and 106, and capacitor 107 serve to provide to the error amplifier 110 signals representing the output voltage $V_O$ and output inductor's current $I_O$ from the regulator 10. The output current is substantially determined by the voltage drop across the resistance $R_W$ of inductor 300 and resistance $R_{S1}$, and $R_{S2}$ of windings 201 and 202, respectively. DC voltage across capacitor 107, is $V_F=(R_W+R_S/2)I_O$. Voltage at node 7 is approximately $V_O+I_O(R_W+R_S/2)$. Since voltage at node 7 is regulated by the closed loop nature of the regulator 10 to voltage $V_{REF}$, the output voltage $V_O$ is maintained to be substantially equal to $V_{REF}-I_O(R_W+R_S/2)$. Consequently, the output impedance is approximately the sum of resistances $R_W+R_S/2$. Accordingly, the output voltage $V_O$ droops with increasing current $I_O$. Magnitude of droop is than determined by sum of resistances $R_W$ and $R_S/2$ rather than only by resistance $R_W$ as in prior art.

The main advantage of the invention is that the voltage $V_F$ across capacitor 107 is $(1+0.5*R_S/R_W)$ times higher than in prior art U.S. Pat. No. 5,877,611, for the same DC resistance of the output inductor and load current, which patent is hereby incorporated herein by reference. In order to demonstrate why increase in voltage $V_F$ by $0.5*R_S/R_L$ is indeed significant improvement over prior art consider the following example: $I_O$=40 A, $R_W$=0.5 mΩ and $R_S$=1 mΩ. Maximum droop voltage in prior art will be 20 mV while in the present invention will be 40 mV, thus twice bigger without any additional active circuitry for amplification. It is obvious that invention provides larger droop voltage and consequently reduces power dissipation in the microprocessor.

As noted above, the output voltage $V_O$ decreases with increasing output current $I_O$. At zero load current ($I_O$=0), the output voltage $V_O=V_{REF}$. When load current increases, the output voltage $V_O$ decreases thus, behaving as a voltage source with open circuit voltage equal to $V_O$ and output DC resistance $(R_W+R_S/2)$. A resistor 108 is added across capacitor 107 to reduce voltage across capacitor 107, if an additional adjustment of droop voltage is require. In this case, the output voltage $V_O$ is approximately $$V_{REF}-I_O(R_W+R_S/2)R_{107}/(R_{107}+R_S/2)$$

where $R_{107}$ is the resistance of resistor 107.

A further adaptation is the addition of resistor 114 to the error amplifier 110. Resistor 114 combined with impedance $Z_1$ allows the output voltage $V_O$ to be scaled to the reference voltage $V_{REF}$ and can be set accordingly.

The choice of resistors 105 and 106, and capacitor 107 affects the response of the switching regulator to transient in output current. A first time constant, inherent to power stage of switching regulator, is defined by the leakage inductances $L_{S1}$ and $L_{S2}$ of secondary windings 201 and 202, respectively and inductance $L_0$ of inductor 300 and their DC resistances $R_{S1}$, $R_{S2}$ and $R_W$, respectively. A second time constant is defined by resistances $R_{105}$ and $R_{106}$ of resistors 105 and 106, respectively and capacitance $C_F$ of capacitor 107. The first time constant is defined as ratio of equivalent resistance $R_{EL}=R_W+R_{105}\|R_{106}$ and an equivalent inductance $L_{EL}=L_0+L_{S1}\|L_{S2}$, i.e. $R_{EL}/L_{EL}$ where, symbol $\|$ represents parallel combination of inductances $L_{S1}$ and $L_{S2}$, and resistors $R_{105}$ and $R_{106}$, respectively. In most practical realization of the converters the leakage inductances, $L_{S1}$ and $L_{S2}$, are more than orders of magnitude smaller that inductance $L_0$ in which case the equivalent inductance is approximately $L_{EL} \approx L_0$ and the first time constant is approximately $\tau_1 = R_{EL}/L_0$. The second time constant is defined as product of equivalent resistance $R_{105}\|R_{106}$ and capacitance $C_F$ of capacitor 107, $\tau_2 = C_F(R_{105}\|R_{106})$.

Figure 2:
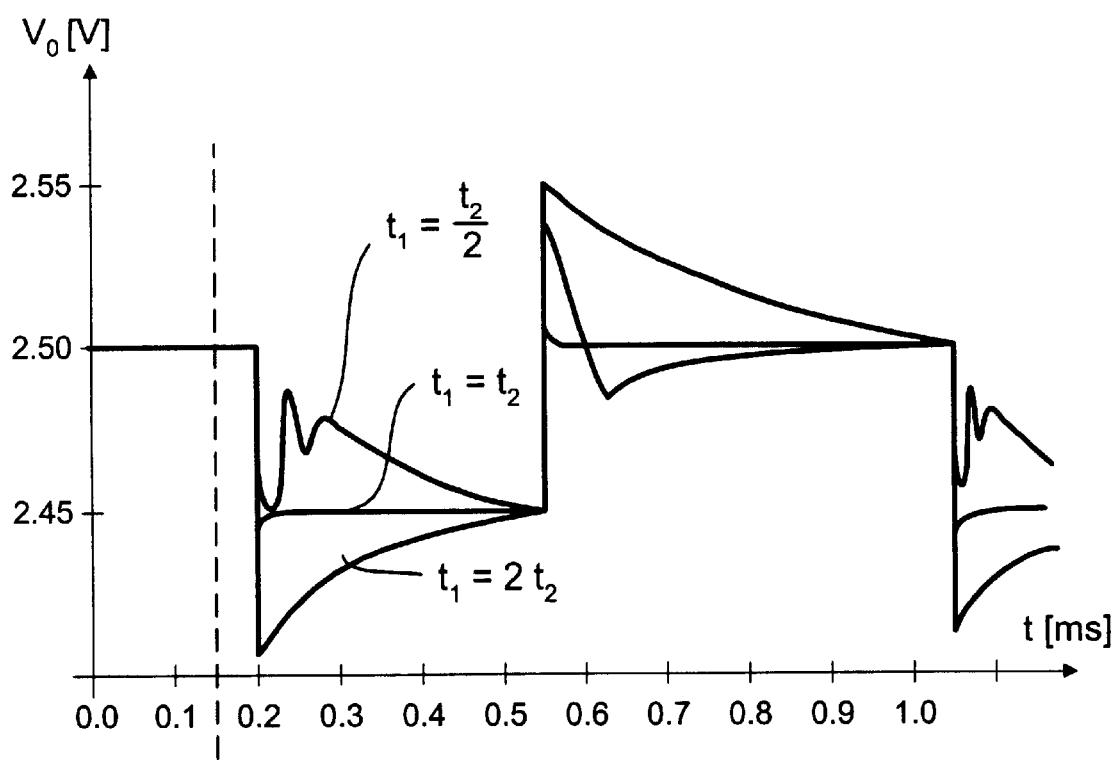
FIG. 2 is a partial circuit diagram of one embodiment for further improved transient response of a switching regulator from FIG. 1.

Relative ration between the first and second time constant affects the response of the switching regulator to transients in output current as illustrated in FIG. 2. In most cases, the flattest response may be the most desirable in which case the second time constant is chosen to be substantially equal to the first time constant, $\tau_2 = \tau_1$.

Figure 3:
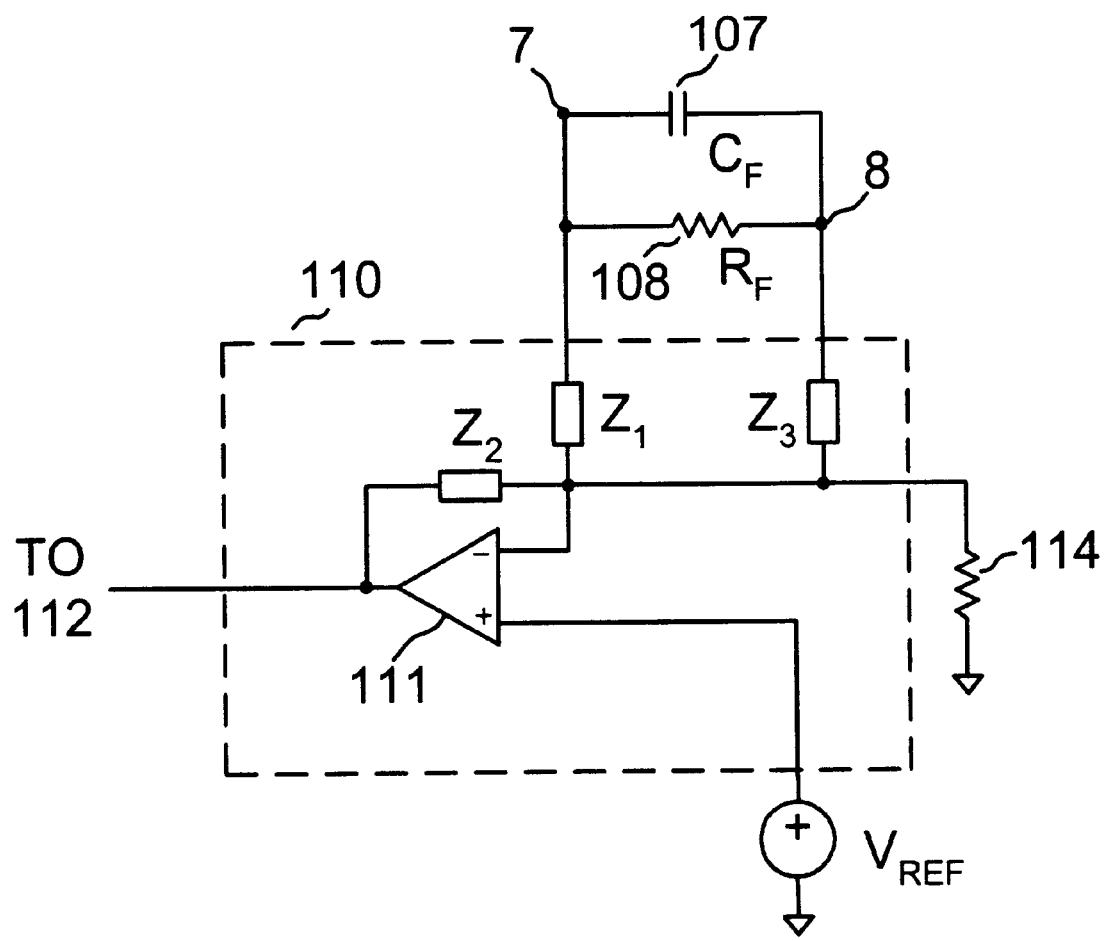
FIG. 3 illustrates effect of different values of resistors and capacitor in current sensor on the transient response of a switching regulator shown in FIG. 1.

It is known to those of skill in the art that while current mode control provides the most stable transient response, the voltage mode control provides the fastest transient response but very often with undesirable oscillations in the output voltage. In one embodiment of the present invention, an impedance $Z_3$ is added to error amplifier 110, as shown in FIG. 3. The output voltage $V_0$ and current dependant voltage at node 7 are fed into operational amplifier 111 and compared with voltage $V_{REF}$. Impedances $Z_1$, $Z_2$ and $Z_3$ are chosen such that optimum transient response is achieved for given application. Impedance $Z_1$ feeds voltage proportional to output current (needed for both droop regulation and stable transient response) into operational amplifier 110 while, impedance $Z_2$ feeds output voltage $V_0$ (needed for fast response) into operational amplifier 110.

In one embodiment of present invention impedance $Z_1$ is chosen to provide only AC coupling from node 7 to the input of operational amplifier 111 while, impedance $Z_2$ provides DC coupling from the output $V_0$ to the input of operational amplifier 111. The output voltage regulation is load independent and current feedback through impedance $Z_1$ affects output voltage regulation loop only during the load current transients providing more stable response.

In one embodiment of present invention impedance $Z_1$ is chosen to provide DC coupling from node 7 to the input of operational amplifier 111 while, impedance $Z_3$ provides only AC coupling from the output $V_0$ to the input of operational amplifier 111. The output voltage regulation is load dependant but now with faster transient response than without impedance $Z_3$.

With load dependant output voltage regulation several converters can be connected in parallel with inherent current sharing provided through output resistance $R_W+R_S/2$ or portion of that if resistor 108 is used, as illustrated in FIG. 1. Multiple regulators 10 can operate in parallel to provide more current to the load 15 than one regulator 10 can provide individually. Regulator can either share a common reference voltage $V_{REF}$ (as shown in FIG. 1) or have independent reference voltage (not shown in FIG. 1).

Many modification and other embodiments of the invention will come to the mind of one skilled in the art having the benefit of the teachings presented in the foregoing descriptions and the associated drawings. Embodiments of the invention herein are shown in a isolated half-bridge converter. The invention may also be applied to other similar converter topologies, e.g. push-pull converters, full-bridge converters, their derivatives and the like.

Therefore, it is to be understood that the invention is not to be limited to the specific embodiments disclosed, and that modifications and embodiments are intended to be included within the scope of the appended claims.

I claim:

1. A switching regulator having an input coupled to a source of potential $V_{IN}$ and having an output providing an output voltage $V_0$ and an output current for powering a load including a microprocessor, the regulator comprising:

a switching circuit having at least two controllable power switches, and at least two rectifier switches coupled in series at a second node, said at least two controllable power switches each having a control node, and said first rectifier switch and said second rectifier switch having control terminal;

a transformer having at least one primary winding coupled to said input via said at least two controllable power switches, and a first and a second secondary windings coupled together in series at a first node, and said first secondary windings coupled to said first rectifier switch at a third node and said second secondary winding coupled to said second rectifier switch at a fourth node and said first secondary winding and said second secondary winding having an inherent DC winding resistances;

an output stage having an output stage input and an output stage output, said output stage input coupled to said first node and said second node, said output stage output coupled to a load, said output stage input and said output stage output having a common node;

an inductor for providing output current to said load circuit having a first terminal coupled to said output stage input and a second terminal coupled to said output stage output and an inherent DC resistance there between;

a first resistor and a second resistor and a capacitor, said first resistor having a first and a second terminal, said second resistor having a first and a second terminal, said capacitor having a first and a second terminal, said first terminal of said first resistor coupled to said third node and said first terminal of said second resistor coupled to said fourth node, said second terminal of said first resistor coupled to said second terminal of said second resistor and said first terminal of said capacitor at a fifth node, said second terminal of said capacitor coupled to said second terminal of said inductor;

a control circuit having a driver circuitry and an error amplifier and modulator circuit for generating control pulses for said driver circuitry, said driver circuitry generating drive signals for said controllable power switches and said first rectifier switch and said second rectifier switch; said error amplifier having an input coupled to said fifth node.

2. The switching regulator as recited in claim 1, further comprising a third resistor disposed in parallel with said capacitor.

3. The switching regulator as recited in claim 1, further comprising an error amplifier having an inverting and a non-inverting input and an output, said inverting input coupled to fifth node and said non-inverting input coupled to a reference voltage, and said output coupled to said modulator circuit for controlling said driver circuit for generating said driver signals.

4. The switching regulator as recited in claim 3, further comprising:
   a first impedance coupled between said fifth node and said inverting input of said error amplifier; and
   a second impedance coupled between said inverting input and output of said error amplifier.

5. The switching regulator as recited in claim 4, further comprising a fourth resistor connected to said inverting input of said error amplifier, wherein said third resistor and said first impedance substantially determines voltage of said switching regulator in proportion to said reference voltage.

6. The switching regulator as recited in claim 5, further comprising a third impedance coupled between said output stage output and said inverting input of said error amplifier.

7. The switching regulator as recited in claim 5, wherein said first impedance provides DC feedback path for load dependant output voltage regulation and said third impedance provides only AC feedback path for more stable transient response.

8. The switching regulator as recited in claim 5, wherein said first impedance provides only AC feedback path for more stable transient response and said third impedance provides DC feedback path for load independent output voltage regulation.

9. The switching regulator as recited in claim 5, wherein said switching regulator is one of the following: half-bridge regulator, push-pull regulator, full-bridge regulator and their derivatives.

10. The switching regulator as recited in claim 9, wherein said rectifier switch further includes a diode.

11. The switching regulator as recited in claim 7, wherein the switching regulator is parallel-coupled to a plurality of switching regulators sharing a common output coupled to a load.

12. The switching regulator as recited in claim 11, further sharing a common reference voltage with said plurality of switching regulators.

13. For use with a switching regulator a method of converting an input voltage from an input source to an output voltage to supply a load including microprocessor employing a switching regulator having a switching circuit having at least two controllable power switches and at least two rectifier switches, power transformer having at least one primary and at least two secondary windings with an inherent DC resistance, an output stage having an inductor with an inherent DC resistance, a control circuit having a driver circuitry and an error amplifier and modulator circuit for generating control pulses for said driver circuitry, said error amplifier having input for a feedback path, a method for configuring the feedback path to provide a signal to regulate the switching regulator, comprising:
   coupling a two feedback resistors to said rectifier switches; and
   series-coupling a capacitor to said feedback resistors and coupled to a fixed potential associated with said switching regulator, said feedback resistors and capacitor configured to provide the signal to regulate said switching regulator as of the voltage drop across the inherent DC resistance of said secondary windings and said inductor.

14. The method as recited in claim 13 wherein said switching regulator further comprising:
   a switching circuit having at least two controllable power switches, and at least two rectifier switches coupled in series at a second node, said at least two controllable power switches each having a control node, and said first rectifier switch and said second rectifier switch having control terminal;
   a transformer having at least one primary winding coupled to said input via said at least two controllable power switches, and a first and a second secondary windings coupled together in series at a first node, and said first secondary windings coupled to said first rectifier switch at a third node and said second secondary winding coupled to said second rectifier switch at a fourth node and said first secondary winding and said second secondary winding having an inherent DC winding resistances;
   an output stage having an output stage input and an output stage output, said output stage input coupled to said first node and said second node, said output stage output coupled to a load, said output stage input and said output stage output having a common node;
   an inductor for providing output current to said load circuit having a first terminal coupled to said output stage input and a second terminal coupled to said output stage output and an inherent DC resistance there between;
   a first resistor and a second resistor and a capacitor, said first resistor having a first and a second terminal, said second resistor having a first and a second terminal, said capacitor having a first and a second terminal, said first terminal of said first resistor coupled to said third node and said first terminal of said second resistor coupled to said fourth node, said second terminal of said first resistor coupled to said second terminal of said second resistor and said first terminal of said capacitor at a fifth node, said second terminal of said capacitor coupled to said second terminal of said inductor;
   a control circuit having a driver circuitry and an error amplifier and modulator circuit for generating control pulses for said driver circuitry, said driver circuitry generating drive signals for said controllable power switches and said first rectifier switch and said second rectifier switch; said error amplifier having an input coupled to said fifth node;
   an error amplifier having an inverting and a non-inverting input and an output, said inverting input coupled to fifth node and said non-inverting input coupled to a reference voltage, and said output coupled to said modulator circuit for controlling said driver circuit for generating said driver signals.

15. The method as recited in claim 13, further comprising a third resistor disposed in parallel with said capacitor.

16. The method as recited in claim 13, further comprising:
   a first impedance coupled between said fifth node and said inverting input of said error amplifier; and
   a second impedance coupled between said inverting input and output of said error amplifier.

17. The method as recited in claim 16, further comprising a fourth resistor connected to said inverting input of said error amplifier, wherein said third resistor and said first impedance substantially determines voltage of said switching regulator in proportion to said reference voltage.

18. The method as recited in claim 15, further comprising a third impedance coupled between said output stage output and said inverting input of said error amplifier.

19. The method as recited in claim 18, wherein said first impedance provides DC feedback path for load dependant output voltage regulation and said third impedance provides only AC feedback path for more stable transient response.

20. The method as recited in claim 18, wherein said first impedance provides only AC feedback path for more stable transient response and said third impedance provides DC feedback path for load independent output voltage regulation.

21. The method as recited in claim 19, wherein the switching regulator is parallel-coupled to a plurality of switching regulators sharing a common output coupled to a load.

22. The method as recited in claim 19, wherein the switching regulator parallel-coupled to a plurality of switching regulator sharing a common reference voltage.

23. The method as recited in claim 13, wherein said switching regulator is one of the following: half-bridge regulator, push-pull regulator, full-bridge regulator and their derivatives.

24. The method as recited in claim 13, wherein said rectifier switch further includes a diode.

* * * * *